United States Patent
Marinovic et al.

(10) Patent No.: US 11,510,168 B2
(45) Date of Patent: Nov. 22, 2022

(54) SYSTEMS AND METHODS FOR GENERATING AND UPDATING PROXIMAL GROUPINGS OF ELECTRONIC DEVICES

(71) Applicant: PricewaterhouseCoopers LLP, New York, NY (US)

(72) Inventors: Srdjan Marinovic, Washington, DC (US); Rebecca E. Cohen, Washington, DC (US)

(73) Assignee: PricewaterhouseCoopers LLP, New York, NY (US)

( * ) Notice: Subject to any disclaimer, the term of this patent is extended or adjusted under 35 U.S.C. 154(b) by 90 days.

(21) Appl. No.: 17/051,684

(22) PCT Filed: Jul. 22, 2019

(86) PCT No.: PCT/US2019/042750
§ 371 (c)(1),
(2) Date: Oct. 29, 2020

(87) PCT Pub. No.: WO2020/023337
PCT Pub. Date: Jan. 30, 2020

(65) Prior Publication Data
US 2021/0243714 A1    Aug. 5, 2021

Related U.S. Application Data

(60) Provisional application No. 62/702,231, filed on Jul. 23, 2018.

(51) Int. Cl.
*H04W 4/00* (2018.01)
*H04W 60/04* (2009.01)
(Continued)

(52) U.S. Cl.
CPC ............ *H04W 60/04* (2013.01); *G01S 5/0289* (2013.01); *H04W 4/023* (2013.01); *H04W 4/80* (2018.02); *H04W 8/005* (2013.01); *H04W 84/12* (2013.01)

(58) Field of Classification Search
CPC ....... H04W 60/04; H04W 84/12; H04W 4/80; H04W 4/023; H04W 8/005; H04W 8/00; H04W 4/02; G01S 5/0289; G01S 5/02
(Continued)

(56) References Cited

U.S. PATENT DOCUMENTS 9,743,436 B1   8/2017  Bradish
9,756,608 B1   9/2017  Bradish
(Continued)

OTHER PUBLICATIONS

International Search Report and Written Opinion issued in International Application No. PCT/US2019/038629 dated Sep. 20, 2019.
(Continued)

*Primary Examiner* — Marceau Milord
(74) *Attorney, Agent, or Firm* — Morrison & Foerster LLP

(57) ABSTRACT

Embodiments described herein generate proximal groupings of wireless signals based upon the temporal persistence and spatial proximity of the wireless signals as observed by a plurality of observer devices. For example, a first observer device may observe a first set of wireless signals at a first timepoint and a second observer device may observe a second set of wireless signals at a second timepoint. The first observer device may again observe a third set of wireless signals at a third timepoint. Based upon these observations, a server may generate a proximal grouping a wireless signals containing a subset of the first, second, third of wireless signals based upon temporal persistence and spatial proximity. Temporal persistence may be based upon the repeated observations of the subset of wireless signals across different
(Continued)

timepoints and the spatial proximity may be based upon the proximity of locations of the observer devices.

20 Claims, 11 Drawing Sheets

(51) Int. Cl.
    *H04W 4/80*     (2018.01)
    *G01S 5/02*     (2010.01)
    *H04W 4/02*     (2018.01)
    *H04W 8/00*     (2009.01)
    *H04W 84/12*     (2009.01)

(58) Field of Classification Search
    USPC ............................................................ 370/329
    See application file for complete search history.

(56) References Cited

U.S. PATENT DOCUMENTS

| | | | |
|---|---|---|---|
| 9,853,826 B2 | 12/2017 | Shuman et al. | |
| 9,900,171 B2 | 2/2018 | Guedalia et al. | |
| 9,998,868 B2 | 6/2018 | Mochizuki et al. | |
| 10,511,938 B1* | 12/2019 | Marinovic | H04W 4/029 |
| 10,685,652 B1* | 6/2020 | Cherukuri | G10L 15/22 |
| 2003/0061072 A1* | 3/2003 | Baker | G16H 10/20 |
| | | | 705/3 |
| 2006/0046709 A1 | 3/2006 | Krumm et al. | |
| 2006/0074494 A1 | 4/2006 | McFarland | |
| 2008/0139114 A1* | 6/2008 | Ranganathan | H04B 5/0062 |
| | | | 455/41.1 |
| 2010/0234045 A1 | 9/2010 | Karr et al. | |
| 2014/0241354 A1 | 8/2014 | Shuman et al. | |
| 2014/0244834 A1* | 8/2014 | Guedalia | H04W 4/21 |
| | | | 709/224 |
| 2015/0065166 A1 | 3/2015 | Ward et al. | |
| 2015/0133162 A1* | 5/2015 | Meredith | G01S 5/0027 |
| | | | 455/456.3 |
| 2015/0185311 A1* | 7/2015 | Lohier | G06F 21/44 |
| | | | 367/118 |
| 2015/0334678 A1 | 11/2015 | Macgougan et al. | |
| 2015/0358777 A1* | 12/2015 | Gupta | H04W 4/02 |
| | | | 370/254 |
| 2016/0036908 A1* | 2/2016 | Aggarwal | H04L 67/16 |
| | | | 370/254 |
| 2016/0078738 A1* | 3/2016 | Basalamah | G06K 7/10366 |
| | | | 340/8.1 |
| 2016/0128017 A1 | 5/2016 | Qiu et al. | |
| 2018/0020329 A1 | 1/2018 | Smith | |
| 2018/0091513 A1 | 3/2018 | Du et al. | |
| 2018/0284735 A1* | 10/2018 | Cella | G05B 23/0264 |
| 2019/0121333 A1* | 4/2019 | Cella | H04L 67/1097 |
| 2019/0349758 A1* | 11/2019 | Zhu | H04W 12/50 |
| 2020/0119939 A9* | 4/2020 | Guedalia | H04L 12/2803 |
| 2020/0191943 A1* | 6/2020 | Wu | G01S 13/726 |

OTHER PUBLICATIONS

International Search Report and Written Opinion issued in International Application No. PCT/US2019/042750 dated Oct. 3, 2019.
International Search Report and Written Opinion issued in International Application No. PCT/US2019/049630 dated Nov. 18, 2019.
Kim et al., "Discovering semantically meaningful places from pervasive RF-beacons," in Proceedings of the 11th international conference on Ubiquitous computing. Oct. 3, 2009, Retrieved on Oct. 26, 2019 from <http://www.eecs.ucf.edu/~lboloni/Teaching/EEL6788_2010/papers/Kim-PlacesRFBeacons.pdf>.

* cited by examiner

SYSTEMS AND METHODS FOR GENERATING AND UPDATING PROXIMAL GROUPINGS OF ELECTRONIC DEVICES

CROSS-REFERENCE TO RELATED APPLICATIONS

This application is the U.S. National Stage of International Application No. PCT/US2019/042750, filed Jul. 22, 2019, published as WO2020/023337 on Jan. 30, 2020, which claims priority under 35 U.S.C. 119(e) to U.S. Provisional Application No. 62/702,231 filed Jul. 23, 2018, all of which are incorporated by reference in their entirety.

TECHNICAL FIELD

This application relates generally to methods and systems for generating and updating proximal groupings formed by a signal sources as observed by one or more observer devices.

BACKGROUND

Electronic devices, especially wireless communications devices, are ubiquitous. It is however difficult to determine proximal relationships between these devices in a world where their locations may not be known and/or are continuously changing. Determining device relationships can reveal groups of similar devices and describe properties of different classes of physical spaces (e.g., hotels, restaurants, etc.), in a similar fashion to systems such as recommendation and classification engines.

Current systems for determining proximal relationships between electronic devices have several technical shortcomings. One problem with conventional approaches is that they rely on (clustering-based) algorithms that operate on location information associated with the electronic devices. In other words, a key premise underlying conventional clustering approaches is that each point (e.g., an electronic device) is described by its location in a given physical space. But locations of the electronic devices may not always be observed directly. Electronic devices may choose not to broadcast their locations or mask their locations for privacy and security reasons. Furthermore, technologies like Virtual Private Network (VPN) have allowed electronic devices to mimic a co-location with a remote network environment.

Without the location information to determine a proximal grouping of electronic devices, then a naive approach would be to find approximations for missing location data from other signals' locations where available. This calculation is expensive, inefficient, and cannot produce results in real-time or pseudo real-time.

As a consequence, a significant improvement in systems and methods for grouping of electronic devices is required.

SUMMARY

What is therefore desired are systems and methods that generate proximal groupings of signals without having to know the locations of the devices emitting the signals. Embodiments described herein generate proximal groupings of wireless signals based upon the temporal persistence and spatial proximity of the wireless signals as observed by a plurality of observer devices. For example, a first observer device may observe a first set of wireless signals at a first timepoint and a second observer device may observe a second set of wireless signals at a second timepoint. The first observer device may again observe a third set of wireless signals at a third timepoint. All three of these observations may be made from a same location or proximate locations. Based upon these observations, a server may generate a proximal grouping a wireless signals containing a subset of the first, second, third of wireless signals based upon temporal persistence and spatial proximity. Temporal persistence may be based upon the repeated observations of the subset of wireless signals across different timepoints and the spatial proximity may be based upon the proximity of locations of the observer devices.

In an embodiment, a computer implemented method comprises receiving, by a computer from a first observer device, identification information of a first set of wireless signals observed by the first observer device at a first timepoint at a first location; receiving, by the computer from a second observer device, identification information of a second set of wireless signals observed by the second observer device at a second timepoint at a second location proximate to the first location; receiving, by the computer from the first observer device, identification information of a third set of wireless signals observed by the first observer device at a third timepoint at a third location proximate to the first and second locations; and generating, by the computer, a proximal grouping of wireless signals containing a subset of the first, second, and third set of wireless signals based on a temporal persistence of the subset of wireless signals across the first, second, and third timepoints and a spatial proximity of the subset of wireless signals as indicated by the first, second, and third locations.

In another embodiment, a system comprises a non-transitory storage medium storing a plurality of computer program instructions; and a processor electrically coupled to the non-transitory storage medium and configured to execute the plurality of computer program instructions to: receive from a first observer device, identification information of a first set of wireless signals observed by the first observer device at a first timepoint at a first location; receive from a second observer device, identification information of a second set of wireless signals observed by the second observer device at a second timepoint at a second location proximate to the first location; receive from the first observer device, identification information of a third set of wireless signals observed by the first observer device at a third timepoint at a third location proximate to the first and second locations; and generate a proximal grouping of wireless signals containing a subset of the first, second, and third set of wireless signals based on a temporal persistence of the subset of wireless signals across the first, second, and third timepoints and a spatial proximity of the subset of wireless signals as indicated by the first, second, and third locations.

In yet another embodiment, a computer-implemented method comprises receiving, by a computer, a plurality of wireless signals observed by a plurality of observer devices within a predetermined time window; and clustering, by the computer, the plurality of wireless signals into a plurality of proximal groupings of wireless signals, each of the plurality of proximal groupings of wireless signals containing spatially proximate and temporally persistent subset of the plurality of wireless signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1A:
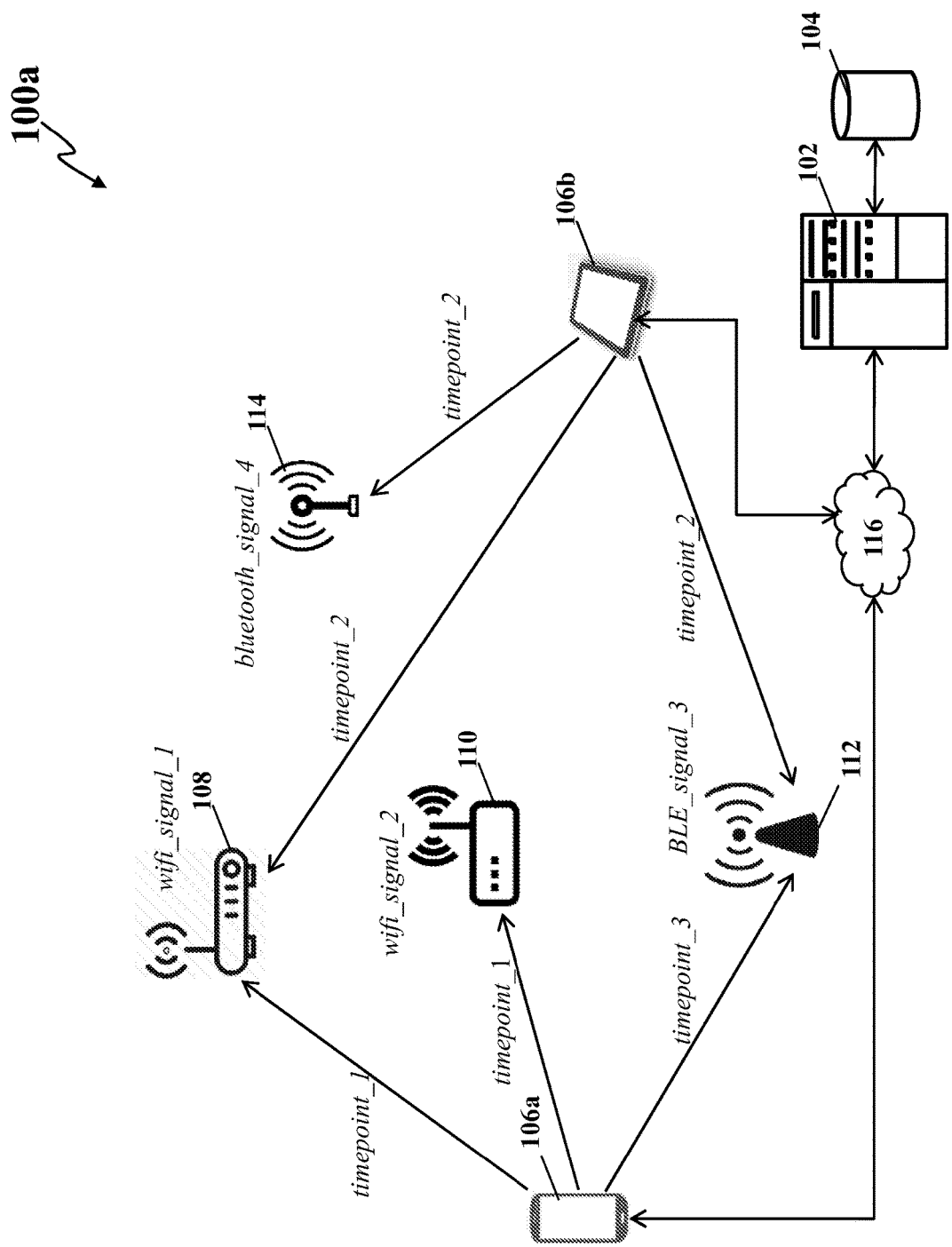
FIGS. 1A-1B illustrate network environments for generating and updating hyperclusters, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

A proximal grouping (also referred to as a hypercluster a signal cluster), as used herein, may refer to a set of wireless signals associated with one another through multiple observations, and which may be further associated with a given location. For example, one or more proximal groupings associated with a given office, coffee shop, or any place may include wireless signals generated a plurality of Wi-Fi routers, Bluetooth transmitters, and/or Bluetooth Low Energy (BLE) transmitters in the place.

To generate a proximal grouping, a first observer device may observe a first set of wireless signals at a first timepoint. For instance, the first observer device may be a smartphone, which may detect a first set of Bluetooth signals, Bluetooth Low Energy (BLE) signals, and/or Wi-Fi signals in the morning. A second observer device may be a tablet computer, which may detect a second set of Bluetooth signals, Bluetooth Low Energy (BLE) signals, and/or Wi-Fi signals during the day. A third observer device may be a smartwatch, which may detect a third set of Bluetooth signals, Bluetooth Low Energy (BLE) signals, and/or Wi-Fi signals in the evening. Based on the temporal persistence of the signals as seen by the observer devices, an analytic server may generate a proximal grouping. The proximal grouping may include, for example, a set of signals observed by each of three devices at different points in time, which may indicate that the sources of those signals may be associated with the location where the signals were observed.

FIG. 1A shows components of a network environment 100 for generating and updating proximal groupings. The system 100 may include an analytic server 102 and a database 104 coupled to the analytic server 102, wherein the analytic server 102 may receive information on wireless signals (or simply signals) detected by one or more observer devices 106 through a network 116 to generate one or more proximal groupings. The analytic server 102 may receive identification information about wireless signals detected by the observer devices 106a, 106b and store the identification information in the database 104 for further processing.

Analytic server 102 may function as an interface for an administrator to set configuration settings or provide operational instructions to various components of the network environment 100. The analytic server 102 may be any device comprising a communications component capable of wired or wireless communication with other components of the network environment 100, and a microprocessor configured to transmit and receive certain types of data from the components of the network environment 100. Non-limiting examples of the analytic server 102 may include a desktop computer, a server computer, a laptop computer, a tablet computer, and the like. For ease of explanation, FIG. 1A shows a single computer device functioning as the analytic server 102. However, it should be appreciated that some embodiments may comprise any number of computing devices functioning as the analytic server 102 and capable of performing the various tasks described herein.

The analytic server 102 may be directly or indirectly connected to observer devices 106a, 106b and database 104. Accordingly, the analytic server 102 may be capable of wired or wireless communication through a variety of communication channels with the observer devices 106a, 106b and the database 104 over a network 116. During the wired or wireless communication between the analytic server 102, the observer devices 106a, 106b, and the database 104, each of these devices may be capable to transmitting and receiving data from each other. In some embodiments, each of these devices may normalize and format the data in accordance to pre-stored instructions prior to transmitting the data to other devices. In some embodiments, each of these devices may store a local copy of the data in their memory prior to transmitting original copy of the data to other devices.

Examples of a network 116 may include, but are not limited to, private or public LAN, WLAN, MAN, WAN, and Internet. The network 116 may include both wired and wireless communications channels according to one or more standards and/or via one or more transport mediums. The communication over the network 116 between the components of the network environment 100 may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g., a GSM (Global System for Mobile Communications), CDMA (Code Division Multiple Access), and EDGE (Enhanced Data for Global Evolution) network.

Observer devices 106a, 106b may be any computing and/or telecommunications devices comprising a processor and capable of performing various tasks and processes described herein. Non-limiting examples of the observer devices may include a telephone 106a (e.g., smartphone), a user computer 106b (e.g., desktop, laptop, server, tablet), or any other telecommunications or computing device capable of performing the various tasks and processes described herein. For ease of explanation, FIG. 1A shows two devices functioning as the observer devices 106a, 106b. However, it should be appreciated that some embodiments may comprise any number of observer devices capable of performing the various tasks described herein.

In some embodiments, observer devices 106a, 106b may be computing devices that function as sensor devices, and are directly or indirectly associated with an analytic server 102 and/or a database 104. The sensor devices may be capable of observing signals in their zone of operation emitted by various devices such as IoT devices. The sensor device may further include a sensor processor configured to process the observed signals and extract identification information from the observed signals. Non-limiting examples of the sensor technologies for the sensor devices may include resonant LC sensors, capacitive sensors, and inductive sensors. Based upon the particular type of the sensor waves used and the particular protocols associated with the sensor waves, the sensor devices may observe signals and then generate sensor data, which may include information associated with the observed signals. The sensor processor may receive, interpret, and process sensor data, which the sensor may then provide to a processor of the analytic server 102 and/or the database 104.

Each observer device may include identification information. The identification information may include a name of the observer device, a type of the observer device, a model number of the observer device, a location information of the observer device, and an ID of the observer device where the ID may be pseudo-random identifier such as a hash value. In some cases, each observer device may have multiple IDs and the IDs may change at any time. All past and current identification information of each of the observer device may be stored in a database 104. For example, a given observer device may have an old ID and a new ID, and in such as case, both the old and new IDs may be stored in the database 104. The analytic server 102 may have access to the identification information of each observer device stored in a database 104. The analytic server 102 may generate a query and/or a request and transmit the query and/or the request at any time to the database 104 to receive identification information of any observer device. In some cases, the analytic server 102 on receiving signal data from the observer device may query the database 104 to receive additional identification information regarding the observer device from which it received the signal data.

As illustrated in FIG. 1A, a first observer device 106a may detect, at timepoint_1, wifi_signal_1 generated by a first WiFi router 108 and wifi_signal_2 generated by a second WiFi router 110. A second observer device 106b may detect, at timepoint_2, wifi_signal_1 generated by the first WiFi router 108, bluetooth_signal_4 generated by Bluetooth transmitter 114, BLE_signal_3 generate by a Bluetooth low energy (BLE) transmitter 112. Furthermore, the first observer device 106a may detect, at timepoint_3, the BLE_signal_3 generated by the BLE transmitter 112. Each of the aforementioned signals may include a tuple of (name, MAC_address, type). Two signals may be equivalent if all three elements between a first and second signal of the three signals are equivalent.

Each observer device 106a, 106b may transmit through the network 116 information of the detected signals to the analytic server 102 for storage in the database 104 and for further analysis. Based on the temporal persistence and spatial proximity of the signals observed by the observer devices 106a, 106b and received by the analytic server 102, the analytic server 102 may define or more proximal groupings associated with the location where the signals are received from.

The data model employed by the analytic server 102 to identify the proximal groupings may include a set of signals S observed by a population of observer mobile devices U. In the illustrative network environment 100a, S={wifi_signal_1, wifi_signal_2, BLE_signal_3, bluetooth_signal_4} and U={106a, 106b}. As described above, each of the signals in the set of signals S may include a tuple of (name, MAC_address, type). The analytic server 102 may identify each observer device 106 with a respective mobile advertising identifier (or any other identifier assigned to or associated with the app or observer device 106), abbreviated as adid. The analytic server 102 may associate each adid of the observer devices 106a, 106b with a matrix of signal and timepoints. More specifically, the analytic server 102 may construct a sparse Boolean matrix to denote which signals an observer adid observed in a given time window. In other words, the Boolean matrix for the observer device 106a, 106b may indicate a presence of (indicated by entry 1) or absence of (indicated by entry 0) one or more signals, as detected by the observer device 106a, 106b for a particular time period. The analytic server 102 may, however, discard signals at stale timepoints as reported by the observer devices 106a, 106b even though the stale timepoints may not indicate a nefarious behavior. For example, if an observer device 106a, 106b has a single observation that stretches credulity (threshold set at more than five days lag), the analytic server 102 may simply remove the observation. In some embodiments, the observer devices 106a, 106b may also transmit the respective latitude longitude coordinates of the observer devices 106a, 106b. In some instances, the observer devices 106a, 106b may observe the wireless location signals from coinciding locations. For example, the latitude longitude coordinates of the observer devices 106a, 106b may be the same.

Figure 1B:
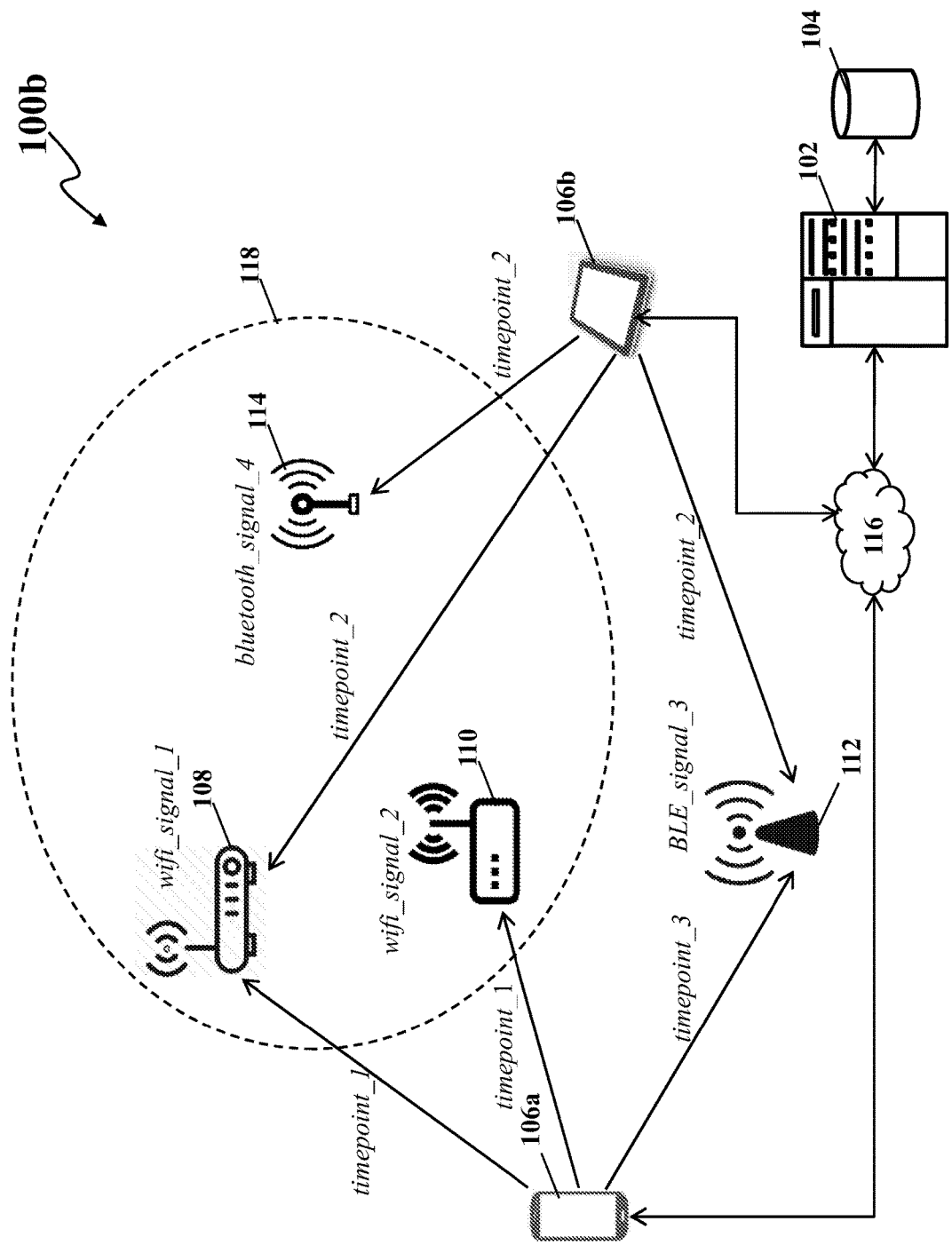

Based on the analysis of the matrices associated with the observer devices 106, the analytic server 102 may generate one or more proximal groupings based on the temporal persistence and spatial proximity of the received signals. FIG. 1B shows a network environment 100b including proximal grouping 118 generated by the analytic server 102 based on the wireless signals detected by the observer devices 106. In this illustration, the proximal grouping 118 may contain three wireless signals: wifi_signal_1, wifi_signal_2, bluetooth_signal_4. The analytic server 102 may determine the spatial proximity of wifi_signal_1, wifi_signal_2, bluetooth_signal_4 based on the fact that the these signals were detected simultaneously or near-simultaneously by each of the observer devices 106a, 106b. The analytic server 102 may determine the temporal persistence of wifi_signal_1, wifi_signal_2, bluetooth_signal_4 based on the fact that the two observer devices 106a, 106b observed these signals at two time points: the first observer device 106a observed these signals at timepoint_1 and the second observer device 106b observed these signals at timepoint_2. However, the analytic server 102 may determine that BLE_signal_3, even though having spatial proximity with wifi_signal_1, wifi_signal_2, bluetooth_signal_4 may not have the requisite temporal persistence. For example, the first observer 106a did not detect BLE_signal_3 at timepoint_1.

Figure 1C:
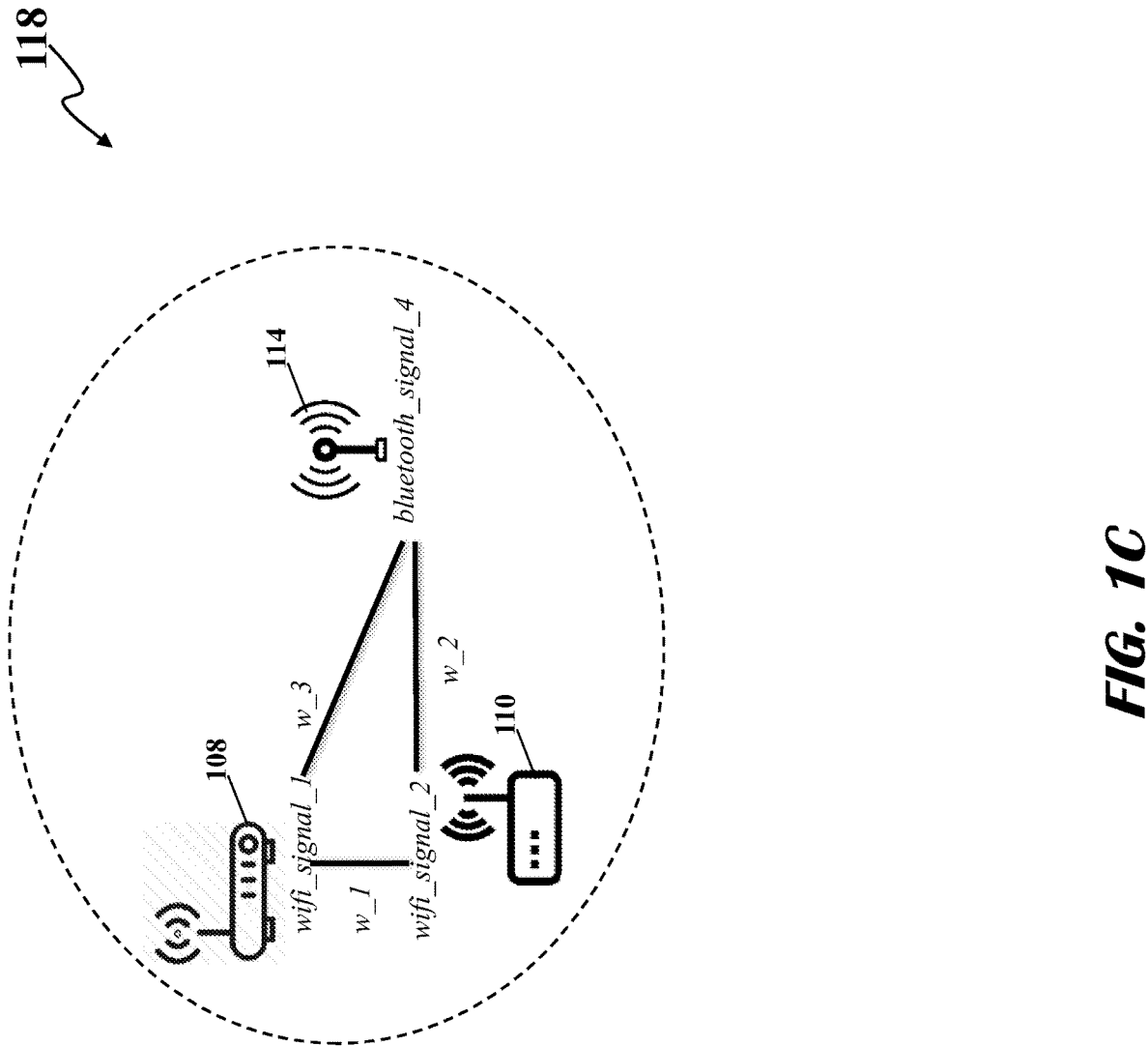
FIG. 1C illustrates a hypercluster, according to an embodiment.

FIG. 1C shows the proximal grouping 118 containing the three wireless signals wifi_signal_1, wifi_signal_2, bluetooth_signal_4 emitted respectively by the first WiFi router 108, a second WiFi router 110, and the Bluetooth transmitter 114. The analytic server 102 may generate the grouping 118 as a graph with the wireless signals forming the nodes and the edges indicating the weights of the relationship between the corresponding pair of nodes. For example, the weight of relationship between wifi_signal_1 and wifi_signal_2 may be w_1, the weight of relationship between wifi_signal_2 and bluetooth_signal_4 may be w_2, and the weight of relationship between wifi_signal_1 and bluetooth_signal_4 may be w_1. The weight of relationship may indicate a likelihood that these signals may observed together. For instance, two signals with a higher weight may be more likely to be observed together than two signals with lower weight. The analytic server 102 may associate the proximal grouping 118 with a known location, for example, the locations of the observer devices 106a, 106b.

The analytic server 102 may set configuration settings or provide operational instructions to observer devices 106a, 106b to make observations of signals transmitted by various devices such as Internet of Things (IoT) devices and then provide analytics and data about signal observation application activity back to the analytic server 102. In some embodiments, the analytic server 102 may generate and transmit the operational instructions to the observer devices 106a, 106b at any point of time in order to enable the observer devices 106a, 106b to make the observations of the signals transmitted by various devices such as IoT devices, and then provide analytics and data about signal observation application activity back to the analytic server 102. In some embodiments, the analytic server 102 may generate and transmit the operational instructions to the observer devices 106a, 106b at any point of time in order to disable the observer devices 106 from making any observations of the signals transmitted by various devices such as IoT devices, and then notify the successful disablement of the observer devices 106a, 106b back to the analytic server 102. In some embodiments, the analytic server 102 may also transmit a weblink of configuration settings to the observer devices 106a, 106b, and the observer devices 106a, 106b may use the weblink for installation of the configuration settings in their hardware and/or software. The configuration settings may enable or disable the observer devices 106a, 106b to make the observations of the signals transmitted by various devices such as IoT devices, and then provide analytics and data about signal observation application activity back to the analytic server 102. In some cases, the configuration settings may enable the observer devices 106a, 106b to make the observations of the signals transmitted by various devices such as IoT devices for a limited period of time (such as 2 hours a day) in the day, and the same configuration settings may also disable the observer devices 106a, 106b from making any observations of the signals during the rest of the day. In some cases, the configuration settings may disable the observer devices 106a, 106b from making any observations of the signals when their battery charge is below a predetermined threshold. For this purpose, the configuration settings may allow the analytic server 102 to constantly monitor battery charge of the observer devices 106a, 106b and when the battery charge is below a predetermined threshold, and then the analytic server 102 may disable the observer devices 106a, 106b from making any observations of the signals. In some cases, the configuration settings may disable some applications of the observer devices 106a, 106b when their battery charge is below a predetermined threshold to allow the observer devices 106a, 106b from making observations of the signals.

The analytic server 102 may receive data including wireless signals detected by observer devices 106a, 106b. In some embodiments, the observer devices 106a, 106b may transmit the data including observed signals to the analytic server 102 as soon as the analytic server 102 detects any signals. In some embodiments, the observer devices 106a, 106b may transmit the observed signals to the analytic server 102 after a predetermined period of time. For example, the observer devices 106a, 106b may be programmed to periodically (e.g., daily) transmit data including all observed signals to the analytic server 102. In some embodiments, the analytic server 102 may fetch data including the observed signals data from the observer devices 106a, 106b periodically (e.g., daily). In some embodiments, the analytic server 102 may fetch data including the observed signals data from the observer devices 106a, 106b based on a triggering condition (e.g., time-based periodic updates, real-time updates). The data may include, but may not be limited to, all observed wireless signals, a timepoint at which each wireless signals was observed, an approximate latitude coordinates of where event of observation is recorded, an approximate longitude coordinates of where event of observation is recorded, among other data and identification information.

The analytic server 102 may store all the data such as observed wireless signals, a timepoint at which each wireless signals was observed, an approximate latitude coordinates of where event of observation is recorded, and approximate longitude coordinates of where event of observation is recorded in a database 104 for further processing. In some embodiments, the analytic server 102 may store all the data in the database 104 in a format in which all the data was received by the analytic server 102. In some embodiments, the analytic server 102 may first normalize and format all the data, and then store the normalized and formatted version of the data in the database 104. The analytic server 102 may use any suitable normalization and formatting technique to normalize and format all the data depending on content, received format, structure, and size of the data. Upon normalization and formatting of the data, the analytic server 102 may execute algorithms such as clustering algorithms to generate one or more proximal groupings of the signal datasets. Each proximal grouping may represent a set of signals that have been observed together by the observer devices 106a, 106b within a number of observations made by the observer devices 106a, 106b. In some cases, for every two observations in the proximal grouping, there may exist at least two overlapping observations that contain said two observations.

The analytic server 102 may establish physical proximity between different locations based on the proximal groupings. For example, a first proximal grouping may be associated with a coffee shop and a second proximal grouping may be associated with an office. If the first and second proximal groupings share at least one wireless signal, the analytic server 102 may determine that the coffee shop and the office are in physical proximity. In other words, the analytic server 102 may compute physical proximity of locations based on the signals within the proximal groupings of those locations.

The observer devices 106a, 106b may be directly or indirectly connected to the analytic server 102 and a database 104. Accordingly, the observer devices 106a, 106b may be capable of wired or wireless communication through a variety of communication channels with the analytic server 102 and the database 104 over a network 116. During the wired or wireless communication between the observer devices 106a, 106b, the analytic server 102, and the database 104, each of these devices may be capable to transmitting and receiving data from each other. In some embodiments, the observer devices 106 may normalize and format the data in accordance to pre-stored instructions prior to transmitting the data to the analytic server 102 and/or the database 104. In some embodiments, the observer devices 106a, 106b may store a local copy of the data in their memory prior to transmitting original copy of the data to the analytic server 102 and/or the database 104.

The observer device 106a, 106b may be configured to observe an event. The event may contain all signals that the observer device 106a, 106b scan around its zone of operation at a given time point. Accordingly, the event may include observed signal data, and in some cases, the event may also include approximate or correct values of latitude coordinates of where the event is recorded by the observer device 106a, 106b at a given time point. In some cases, the event may further include approximate or correct values of longitude coordinates of where the event is recorded by the observer device 106a, 106b at a given time point.

The event is caused when observer device 106a, 106b observes signals from various devices such as IoT devices. The signals may be an electromagnetic signal emitted by the IoT devices. It is to be noted that the signal may be any type of signal emitted by the IoT devices without moving out the scope of the disclosed embodiments. The signals observed by the observer device 106a, 106b may represent discrete values about the signals. In some embodiments, the discrete values of the signals may be characterized by a type of signal. The type of signal may include, but may not be limited to, Bluetooth® signals, wireless fidelity (Wi-Fi) signals, or Bluetooth Low Energy (BLE) signals. In some embodiments, the discrete values of the signals may further be characterized by a name of signal. The name of the signal may be a SSID (service set identifier) that identifies IoT device. The SSID may be a unique ID that consists of 32 characters and is used for naming wireless networks. In some embodiments, the discrete values of the signals may further be characterized by an address of the IoT device through which the device communicates the signal. Each IoT device may emit multiple signals.

Network components may effectuate wired and/or wireless signal communications to and from various devices. The network components may include transmitters, a first WiFi router 108, a second WiFi router 110, and a Bluetooth low energy (BLE) transmitter 112. These network components may be an embedded component of an electronic device; and, in some cases, the network component may be attached to the electronic device through any wired or wireless communications medium. The network components such as the first WiFi router 108, the second WiFi router 110, and the Bluetooth low energy (BLE) transmitter 112 may include electromechanical components (e.g., processor, antenna) that allow the network components to communicate various types of signal data with one or more electronic devices. In some implementations, these signals may represent a distinct channel for hosting communications. The data may be communicated using signals, based on predetermined wired or wireless protocols and associated hardware and software technology. The network components may operate based on any number of communication protocols, such as Bluetooth®, Wireless Fidelity (Wi-Fi), and others.

Databases 104 may be directly or indirectly connected to observer devices 106a, 106b and an analytic server 102. Accordingly, the database 104 may be capable of wired or wireless communication through a variety of communication channels with the observer devices 106a, 106b and the analytic server 102 over a network 116. During the wired or wireless communication between the analytic server 102, the observer devices 106a, 106b, and the database 104, the database 104 is capable of receiving data from the analytic server 102 and the observer devices 106. The data may include, but may not be limited to, all observed wireless signals, a time point at which each wireless signal was observed by the observer devices 106a, 106b, an approximate latitude coordinate of where event of observation is recorded by the observer devices 106a, 106b, an approximate longitude coordinate of where event of observation is recorded by the observer devices 106a, 106b, among other data and identification information. For ease of explanation, FIG. 1A shows a single database 104. However, it should be appreciated that some embodiments may comprise any number of databases capable of performing the various tasks described herein.

The database 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the analytic server 102 and the observer devices 106a, 106b. In some embodiments, a memory of the databases 104 may be a non-volatile storage device. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. In some embodiments, a memory of the databases 104 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Figure 2:
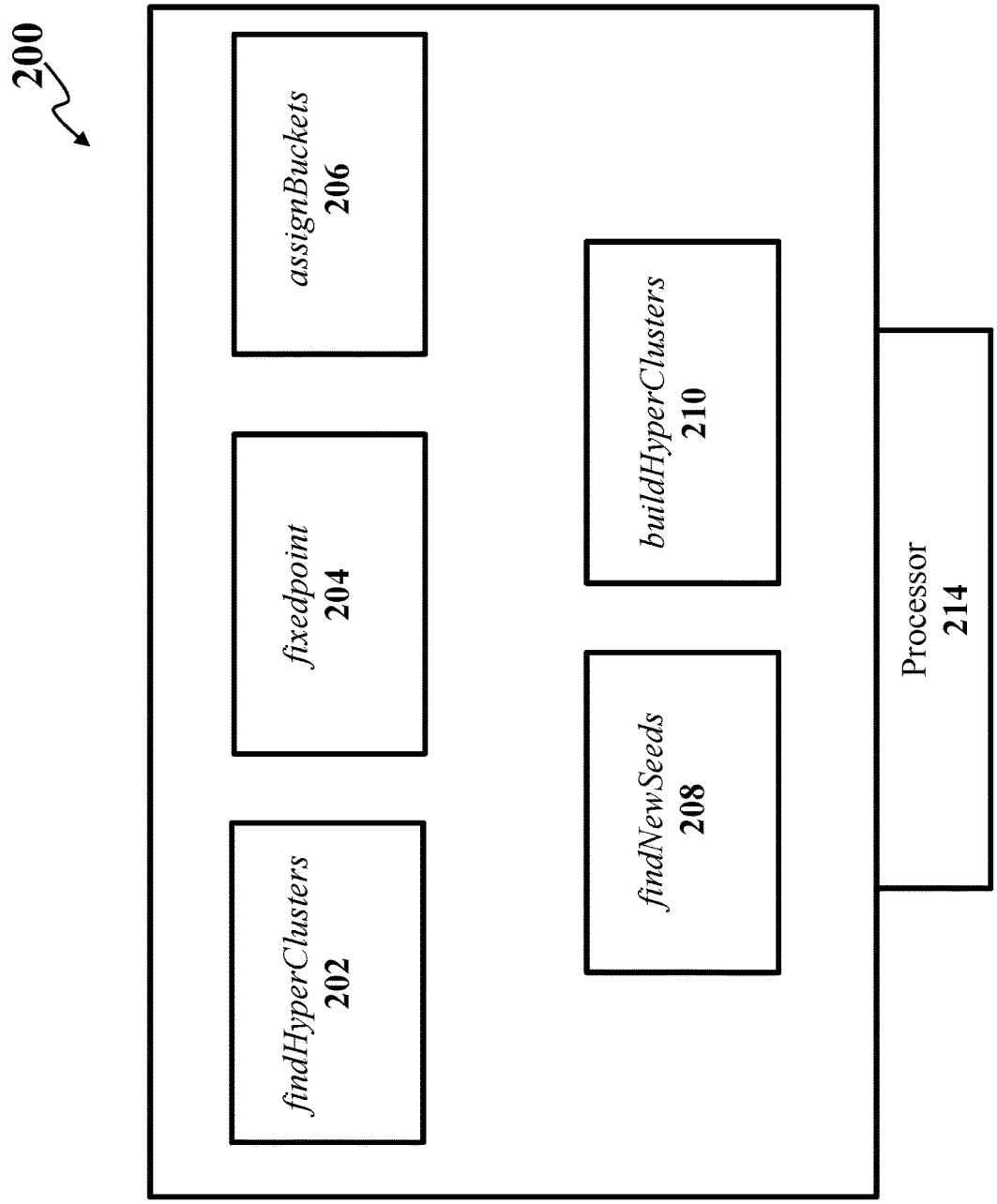
FIG. 2 illustrates various modules for generating and updating hyperclusters, according to an embodiment.

FIG. 2 illustrates various software modules 200 for generating proximal groupings (also referred to as hyperclusters). The various software modules may include findHyperClusters 202, fixedpoint 204, assignBuckets 206, findNewSeeds 208, and buildHyperClusters 210. Each module may include a set of computer programs and/or codes stored in a memory associated with a processor 214 of a server computer such as an analytic server. The processor 214 may be configured to generate and implement one or more sets of instructions and/or algorithms (such as clustering algorithms) to execute the various modules such as findHyperClusters 202, fixedpoint 204, assignBuckets 206, findNewSeeds 208, and buildHyperClusters 210. In some embodiments, the processor 214 may be configured to implement one or more sets of instructions and/or algorithms (such as clustering algorithms) stored in a memory in order to execute the various modules such as findHyperClusters 202, fixedpoint 204, assignBuckets 206, findNewSeeds 208, and buildHyperClusters 210.

The processor 214 may be coupled to a memory. The processor 214 may further include an arithmetic logic unit and a control unit. The arithmetic logic unit may be coupled to the control unit. The arithmetic logic unit may be configured to perform one or more mathematical and logical operations, and the control unit may control the operation of the arithmetic logic unit. The processor 214 may implement a set of instructions, programs, codes, and/or scripts stored in the memory to perform the one or more operations such as execution of the various modules including findHyperClusters 202, fixedpoint 204, assignBuckets 206, findNewSeeds 208, and buildHyperClusters 210. The processor 214 may be implemented based on a number of processor technologies. Examples of the processor 214 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

A processor 214 may execute a clustering algorithm to generate hyperclusters from observations received from various observer devices. An input to the clustering algorithm may include partial or complete observations received from various observer devices, and an output from the clustering algorithm may include a set of clusters, which may contain observations that are close in a vector space. Each cluster in the set of clusters may include overlapping observations thereby establishing partial ordering between the observations that may have never been observed together. Each cluster may also be referred to as a hypercluster. As a consequence, the clustering algorithm may generate a set of hyperclusters. A hyperclusters may form a graph where edges exist if there are overlapping observations made by the observer devices. The graph may be used to determine partial orderings between observations made by the observer devices based on the shortest paths in the graph, which further allows to approximate a structure of a hidden vector space of the observations.

An observation may be an event generated by an observer device. The event may contain all signals that the observer device may scan around its zone of operation at a given timepoint. The event may also contain an approximate or correct values of latitude and longitude coordinates of where the event occurred. Accordingly, a hypercluster generated based on a plurality of events may represent a set of wireless signals that have been observed together by the observer devices within a number of observations made by the observer devices. For example, for every two wireless signals in the hypercluster, there may exist at least two overlapping observations that contain the two wireless signals observed by the observer devices.

Upon execution of the clustering algorithm, a processor 214 may determine that highly overlapping observations made by the observer devices describe a set of closely positioned items/devices emitting the signals. During such determination, the processor 214 may constrain a growth of sets of overlapping observations made by the observer devices with centroid observations. The processor 214 may ensure that all the observations made by the observer devices overlap with their respective centroids, which in turn forces centrality. This property taken into account by the processor 214 may result in yielding more highly concentrated clusters. The processor 214 may then compress each set of observations made by the observer devices into a normalized item-frequency table to generate a hypercluster and discard all the outlier signals. The algorithm executed by the processor 214 follows a fixpoint construction. The inputs to the algorithm are observations made by the observer devices and a hyperparameter $\sigma$. The hyperparameter $\sigma$ is a similarity cutoff that determines the minimum overlap for observations made by the observer devices to be considered similar by the processor 214 it order to create the hyperclusters. In other words, the hyperparameter $\sigma$ may indicate threshold degree of overlap across the observations by different observer devices for the observations to be included in a hypercluster.

In response to execution and/or implementation of an algorithm by the processor 214, various modules may also be executed. For instance, in response to execution and/or implementation of the algorithm from the processor 214, findHyperClusters 202 may initiate fixedpoint steps, and resulting buckets of observations received from various observer devices are then generated into one or more hyperclusters. A pseudo code, which is an informal description of an operating principle of a computer program or an algorithm corresponding to functions of findHyperClusters 202 is as follows:

```
Function findHyperClusters(obs, σ)
    seeds ← [ ];
    buckets ← findFixedPoint(obs, seeds, σ);
    return buildHyperClusters(buckets)
end
```

In response to execution and/or implementation of an algorithm by the processor 214, fixedpoint 204 may iterate over the observations received from various observer devices by first assigning the observations to a set of existing centroids (also referred to as seeds) and then evaluating whether the existing seeds are correct centroids. In order to determine whether the existing seeds are correct centroids, the fixedpoint 204 may determine whether the existing seeds are still the most similar observations to a hypercluster created from a current set of observations. The fixedpoint 204 may use a centrality measure instead of averaging similarity of a given observation made by the observer devices to all others observations, which is both an optimization as well as a better representation of the hypercluster. A pseudo code, which is an informal description of an operating principle of a computer program or an algorithm corresponding to functions of fixedpoint 204 is as follows:

```
Function fixedPoint(obs, seeds, σ)
    buckets ← assignBuckets(obs,seeds, σ);
    newSeeds ← findNewSeeds(buckets);
    if repeated(newSeeds) then
        return buckets
    else
        return fixedPoint(obs, newSeeds, σ)
    end
end
```

In response to execution and/or implementation of the algorithm by the processor 214, assignBuckets 206 may loop through observations received from various observer devices, and finds a closest seed if such closest seed exists. When the assignBuckets 206 determines that no such closest seed exists, then assignBuckets 206 start a new bucket (with a new seed or centroid) of observations made by the observer devices. A pseudo code, which is an informal description of an operating principle of a computer program or an algorithm corresponding to functions of assignBuckets 206 is as follows:

```
Function assignBuckets(obs, seeds, σ)
    buckets ← [ ];
    for o ∈ obs do
        bucket ← findClosestBucket(o, buckets, σ);
        if bucket is none then
            bucket.centroid ← o;
            bucket.obs ++ o;
            buckets ++ bucket;
        else
            bucket.obs ++ o
        end
    end
    return buckets
end
Function findClosestBucket(o, buckets, σ)
    bestSim ← 0;
    for p ∈ observations do
        oSim ← o ~ p;
        if oSim > bestSim ∧ oSiM > σ then
            bestSim ←p;
            bestO ← p;
        end
    end
    return bestO
end
```

In response to execution and/or implementation of an algorithm by the processor 214, findNewSeeds 208 may generate one or more hyperclusters from existing buckets of observations made by the observer devices, and then extract corresponding centroids (or new seeds) from the one or more hyperclusters. A pseudo code, which is an informal description of an operating principle of a computer program or an algorithm corresponding to functions of findNewSeeds 208 is as follows:

```
Function findNewSeeds(buckets)
    clusters ← buildHyperCluster(buckets);
    seeds ← extractCentroids(clusters, buckets);
    return seeds;
end
Function extractCentroids(clusters, buckets)
    seeds ← [ ];
    foreach cluster, bucket ∈ clusters, buckets
    do
        seeds ++ extractCentriod(cluster, bucket);
    end
    return seeds;
end
Function extractCentroid(cluster, bucket)
    bestSim ← 0;
    for o ∈ bucket do
        if o ~ cluster > bestSim then
            bestSim ← o ~cluster;
            bestO ← o;
        end
    end
    return bestO
end
```

In response to execution and/or implementation of an algorithm by the processor 214, buildHyperClusters 210 may count frequency of each item in a bucket of observations made by the observer devices, and then normalize a frequency number of each item in a bucket of observations by a number of observations in the bucket. A pseudo code, which is an informal description of an operating principle of a computer program or an algorithm corresponding to functions of buildHyperClusters 210 is as follows:

```
Function buildHyperClusters(buckets)
    clusters ← [ ];;
    foreeach bucket ∈ buckets do
        clusters ++
        buildHyperClusters(bucket);
    end
    return clusters;
end
Function buildHyperCluster(bucket)
    cluster ← emptyCluster;
    for o ∈ bucket do
        for e in o do
            increment count of e in cluster;
        end
    end
    n ← len(buckets);
    foreach e ∈ cluster do
        weight ← 1/n;
    end
    return cluster;
end
```

In some embodiments, the processor 214 may adjust a value of a hyperparameter σ in above-mentioned clustering algorithms corresponding to functions of various modules. The adjustment in the value of hyperparameter σ may result in change of output results of the clustering algorithms. For instance, when the processor 214 adjusts a value of hyperparameter σ to have a lower similarity cutoff, then output results of the clustering algorithms may be fewer number of hyperclusters, but with more observations assigned to each hypercluster. Accordingly, in these output hyperclusters, the processor 214 may visualize each hypercluster as covering a larger area in space. The processor 214 may find these output hyperclusters to be convenient in analyzing large areas in space since the observations that may be four or five hops away with a similarity cutoff of 0.5 can be only one hop away with a cutoff of 0.1. Consequently, as lowering value of the similarity cutoff produces fewer hyperclusters, it will correspondingly result in lower costs of time and memory for the processor 214 due to a greater compression of the data. In addition, since each hypercluster is built from more observation data, there will also be a reduction in random noise. The processor 214 may select a value of the similarity cutoff from a range of appropriate numbers depending on the underlying structure of the data as well as the clustering goals.

Figure 3:
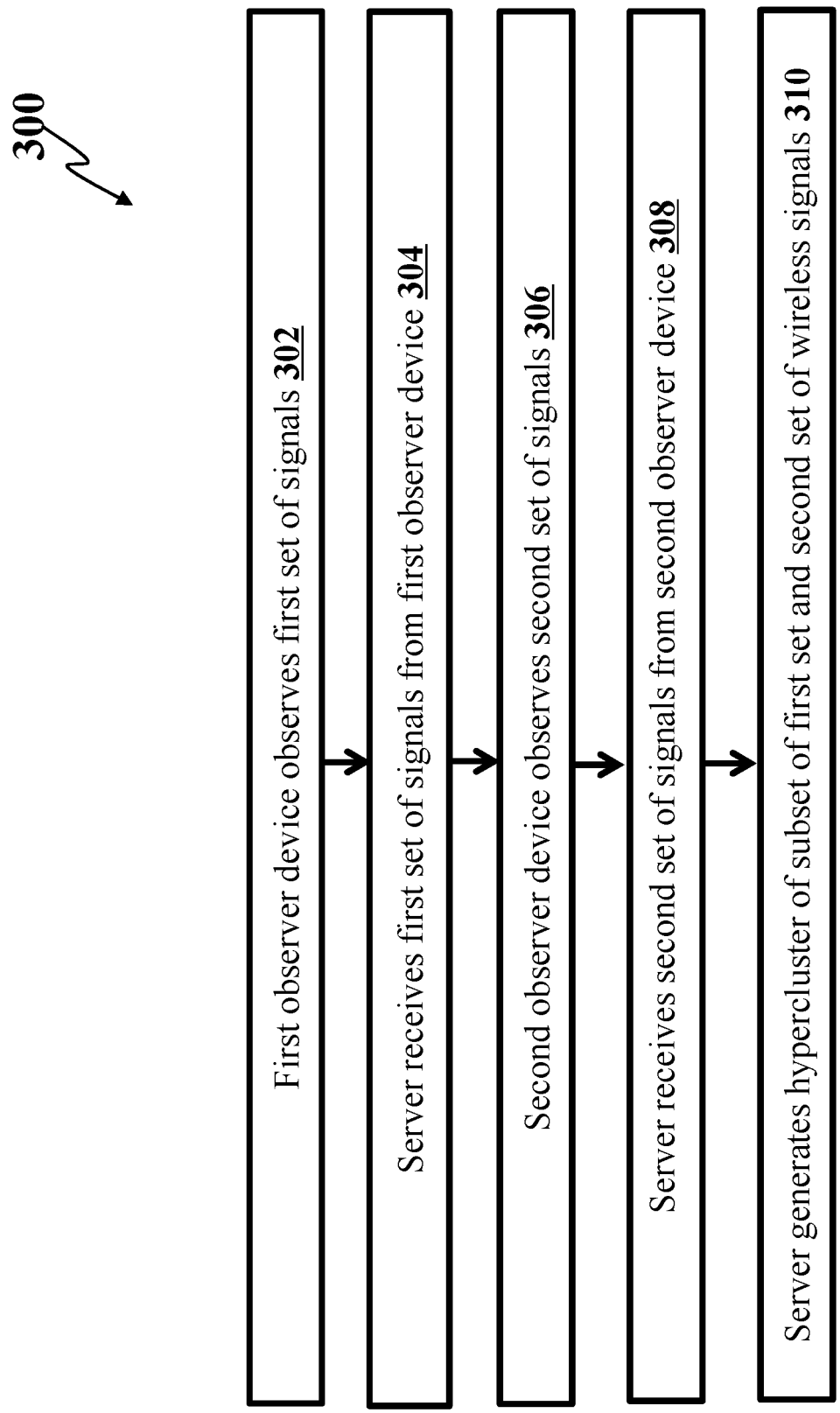
FIG. 3 illustrates a flowchart for generating and updating hyperclusters, according to an embodiment.
Figure 4:
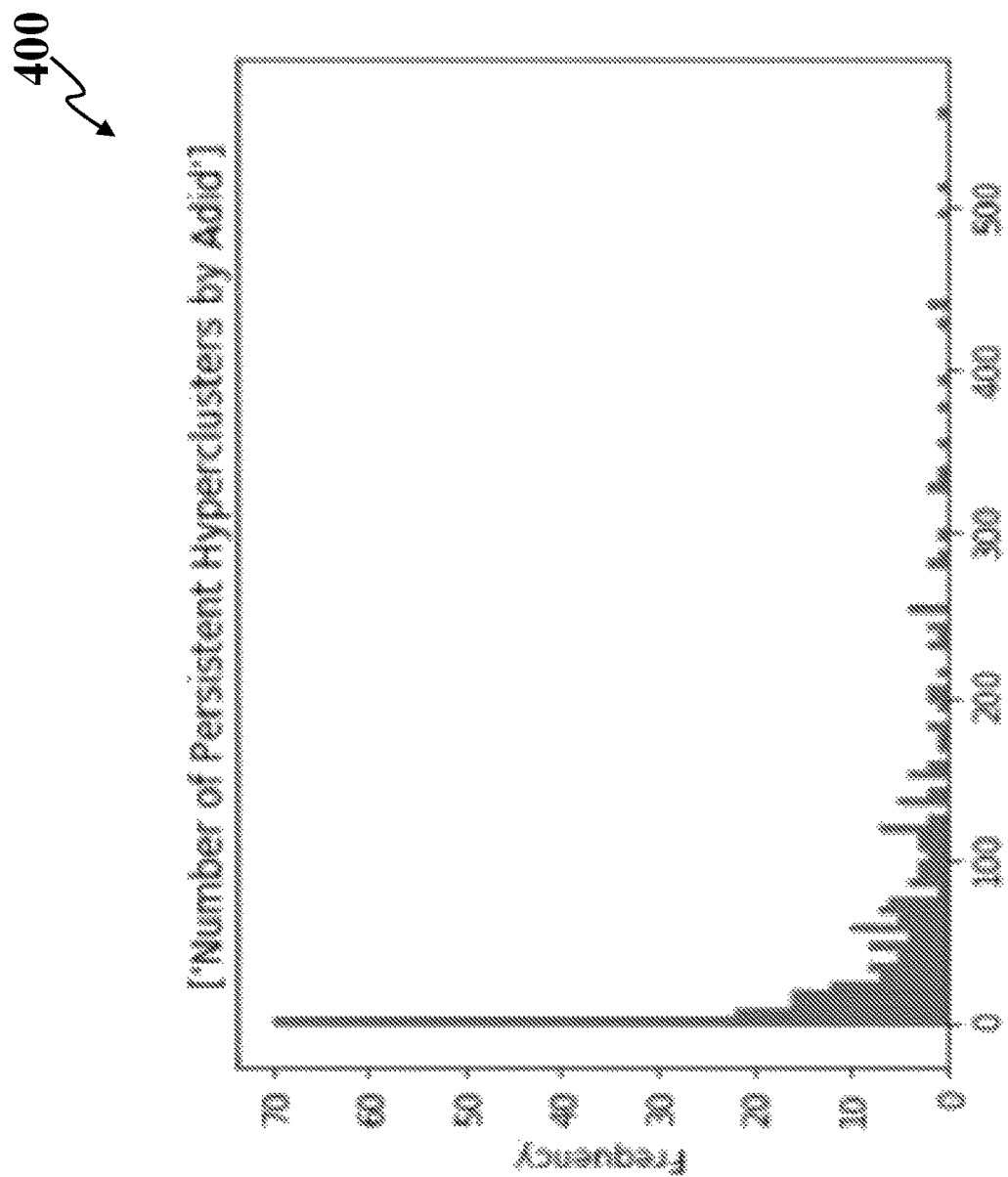
FIG. 4 illustrates a graph for a number of persistent hyperclusters by advertising identifiers (adids) with respect to frequency, according to an embodiment.
Figure 5:
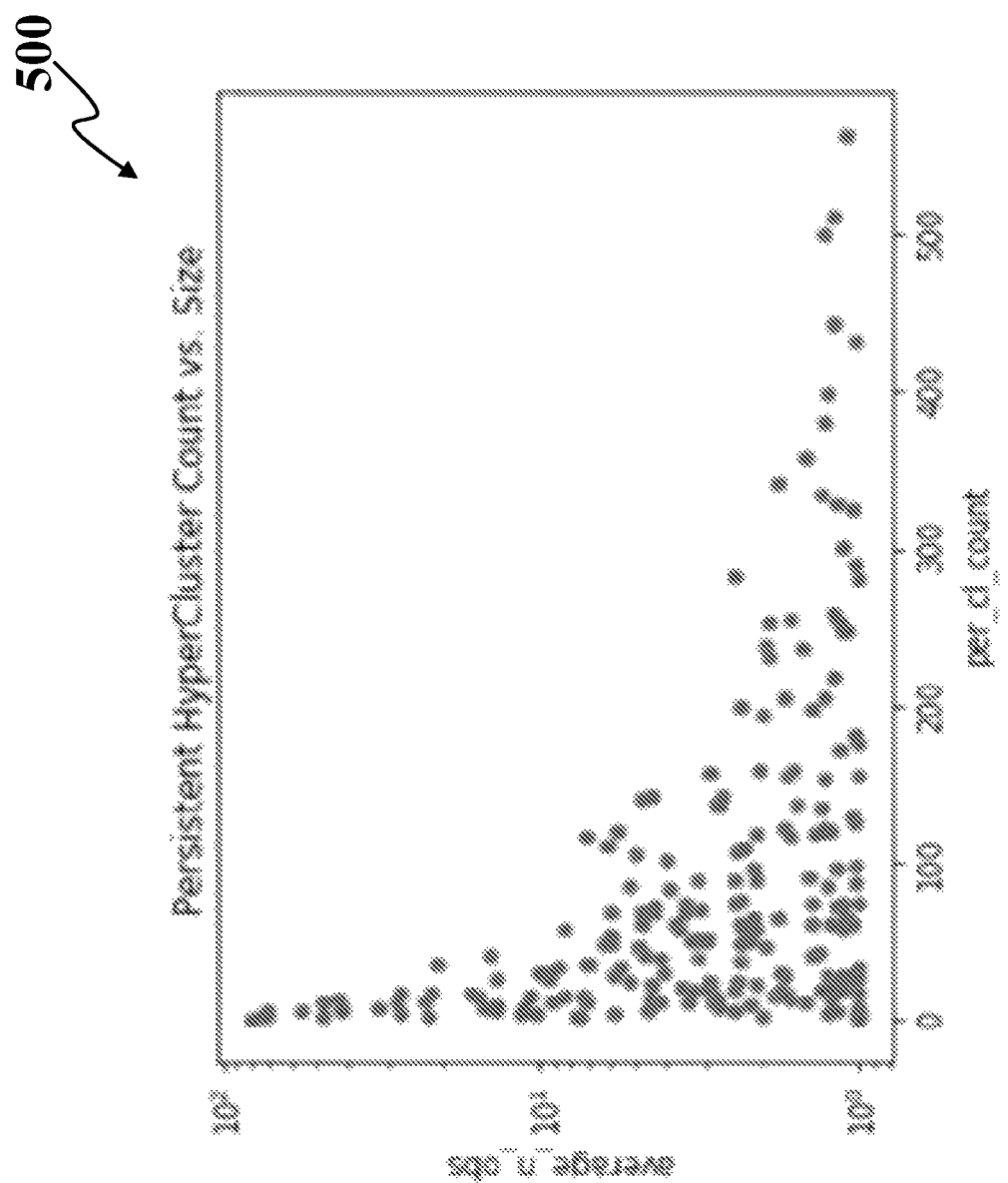
FIG. 5 illustrates a graph for a persistent hypercluster count verses size, according to an embodiment.
Figure 6:
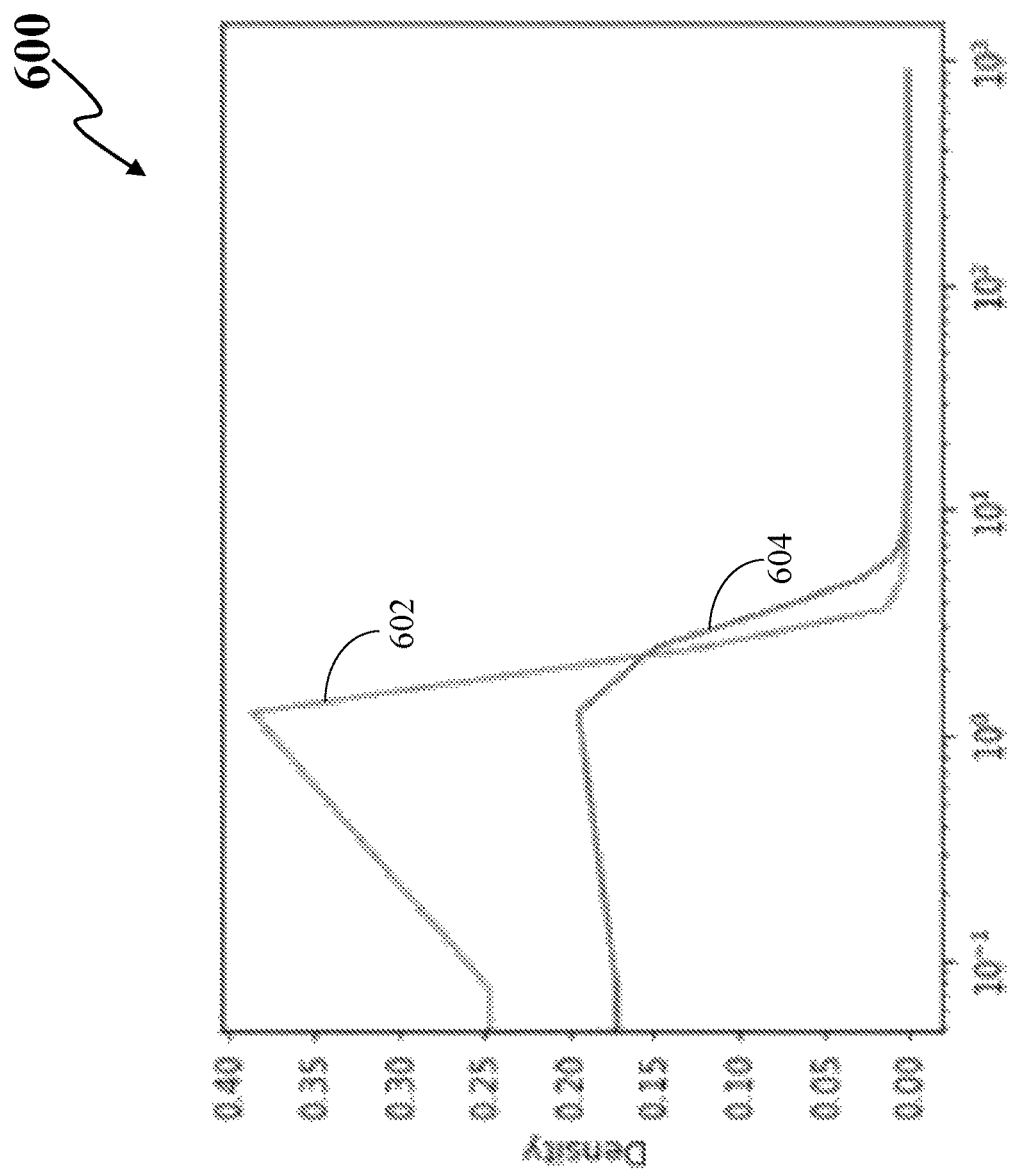
FIG. 6 illustrates a graph for a distribution of persistent hypercluster and transient hyperclusters, according to an embodiment.
Figure 7:
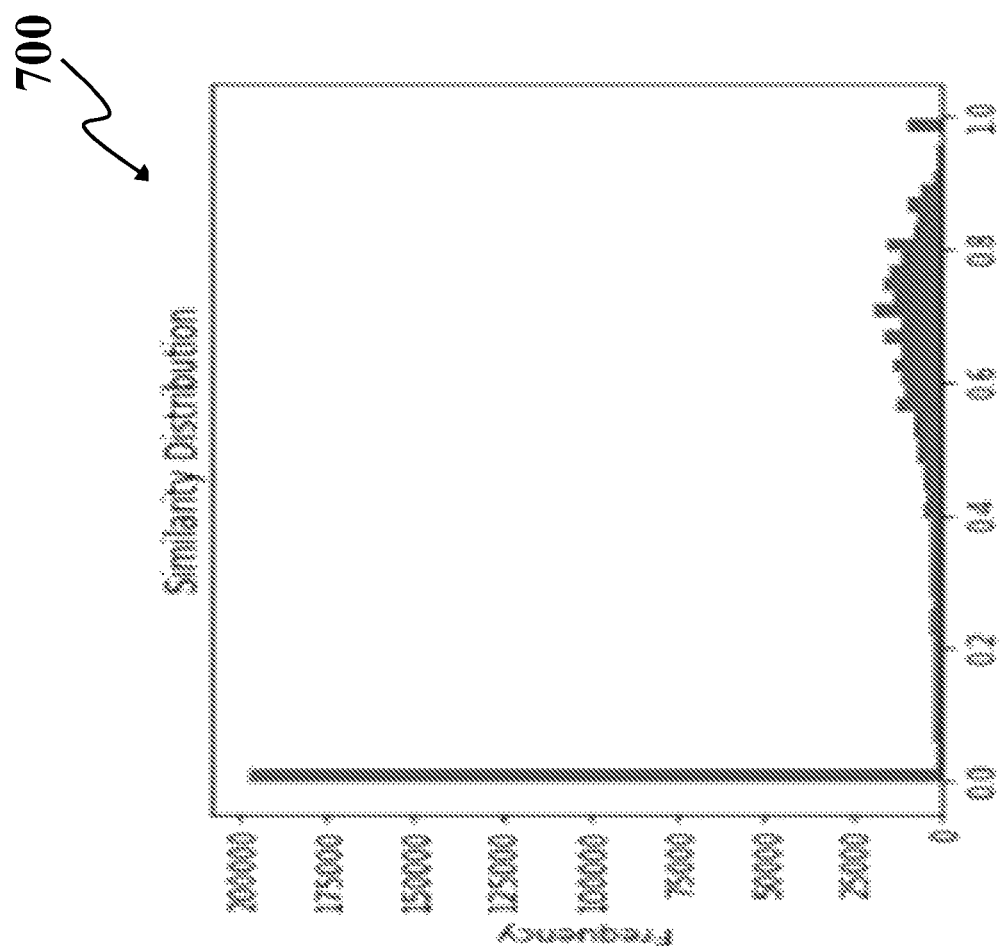
FIG. 7 illustrates a graph for a distribution of persistent hypercluster with respect to frequency, according to an embodiment.
Figure 8:
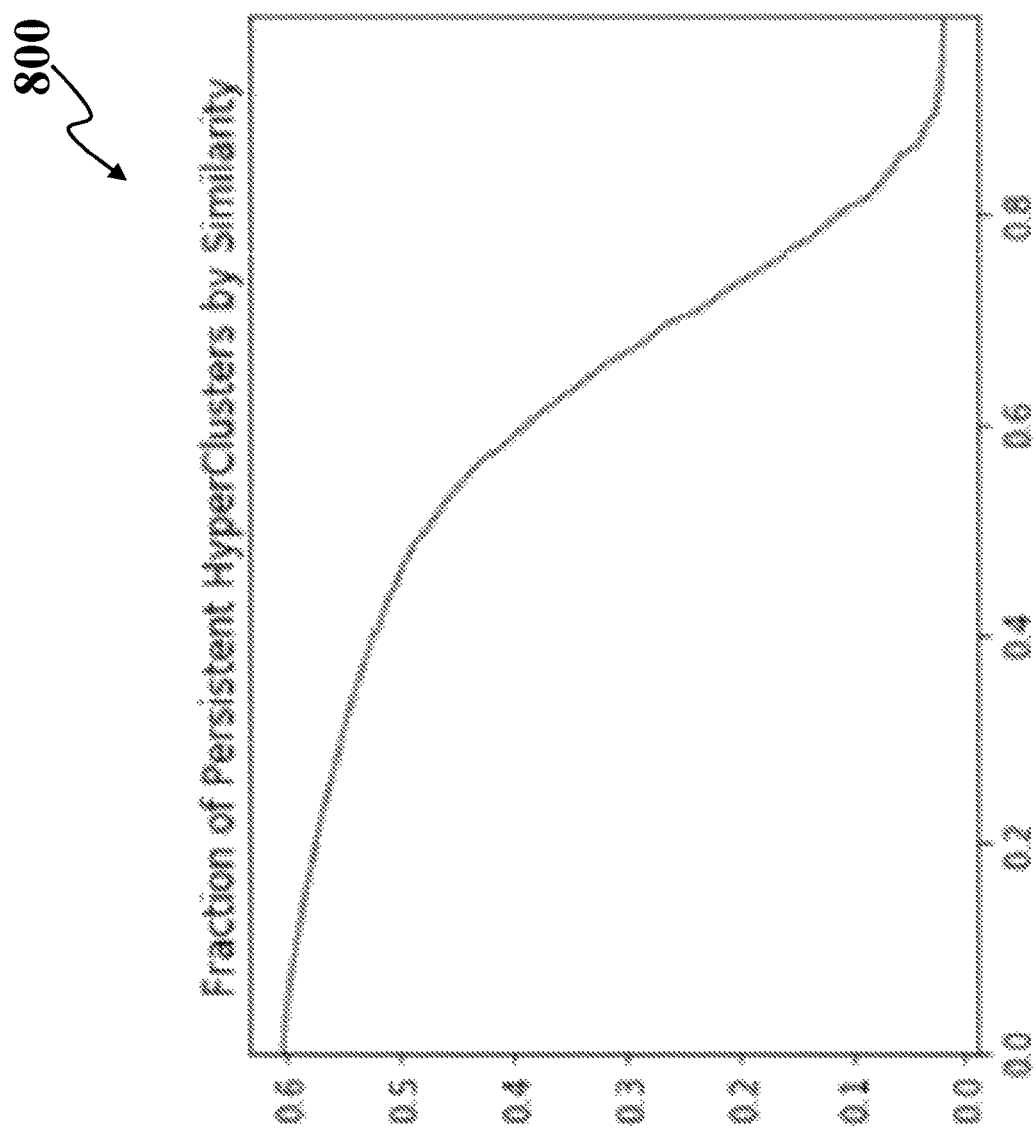
FIG. 8 illustrates a graph for a fraction of persistent hyperclusters by similarity, according to an embodiment.
Figure 9:
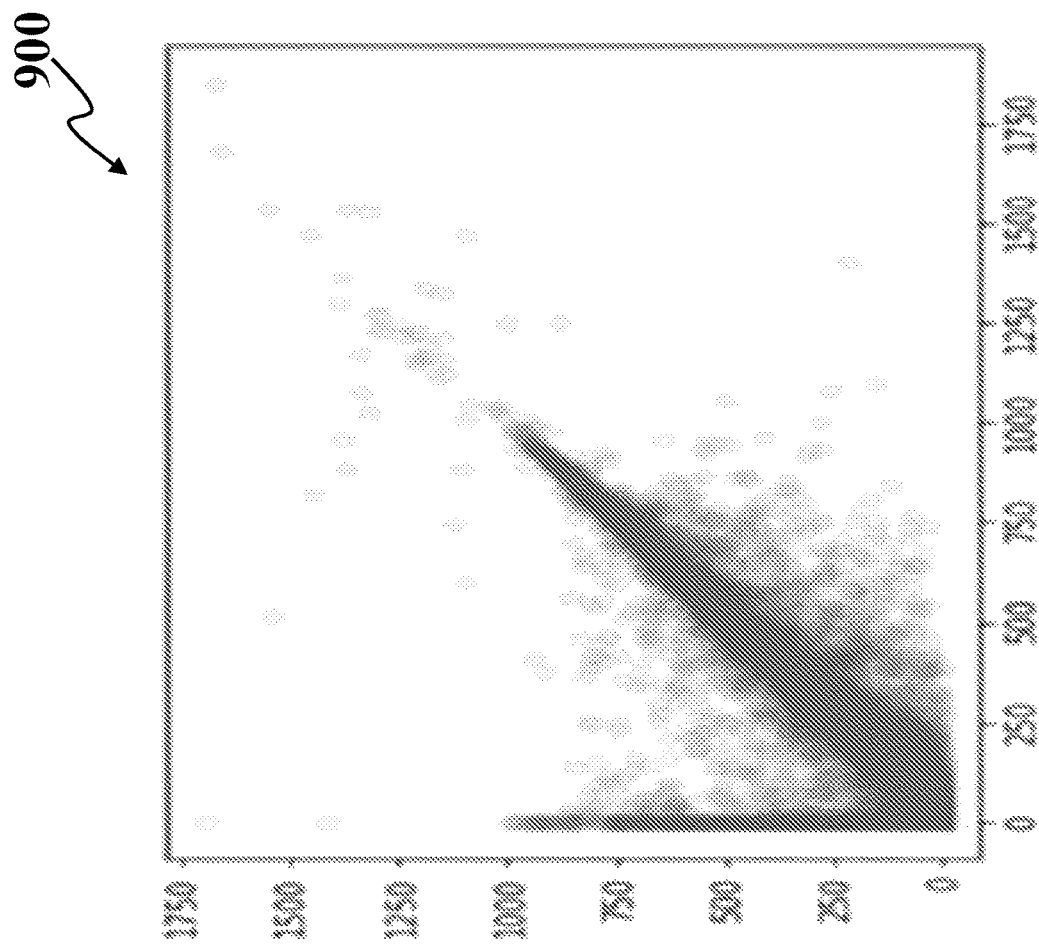
FIG. 9 illustrates a graph for weighted hyperclusters verses observations, according to an embodiment.

FIG. 3 shows execution of a method 300 for generating and updating proximal groupings (also referred to as hyperclusters) of electronic devices. The illustrative method 300 shown in FIG. 3 comprises execution steps 302, 304, 306, 308, and 310. However, it should be appreciated that other embodiments may comprise additional or alternative execution steps or may omit one or more steps altogether. It should also be appreciated that other embodiments may perform certain execution steps in a different order; steps may also be performed simultaneously or near-simultaneously with one another. In addition, the illustrative method 300 of FIG. 3 is described as being executed by a single server computer in this embodiment. However, one should appreciate that, in some embodiments, steps may be executed by any number of computing devices operating in a distributed computing environment. In some cases, a computer executing one or more steps may be programmed to execute various other, unrelated features, where such server computer does not need to be operating strictly as described herein.

In a first step 302, a first observer device may make an observation of a first set of signals. The observation may be an event generated by the first observer device. The event may contain all signals such as the first set of signals that the first observer device scans around its zone of operation at a given time point. The event may also contain approximate or correct values of latitude and longitude coordinates of where the event occurred.

The first set of signals may be emitted by various devices such as Internet of Things (IoT) devices. The IoT may be a network of physical devices, vehicles, home appliances, and other items embedded with electronics, software, sensors, actuators, and connectivity which enables these devices to connect and exchange data over networks. The IoT devices may be remotely monitored and controlled. Non-limiting examples of the IoT device may include smart TVs, smart speakers, toys, wearables, smart appliances, smart meters, commercial security systems, smart city technologies such as those used to monitor traffic and weather conditions, smart air conditioning, smart thermostats, smart lighting, smart cars, and smart sensors.

The first observer device may be any computing and/or telecommunications device comprising a processor and capable of performing the various tasks and processes such as observing signals. Non-limiting examples of the first observer device may include a computer (e.g., desktop, laptop, server, tablet), a telephone (e.g., smartphone), a smart watch, a car, a sensor device, or any other telecommunications or computing device used to interact with various type of signals. A server may generate and execute instructions in order to turn the first observer device, which is a computing device, to perform observations of signals from various other devices, such as IoT devices. For instance, the server may provide and implement a software development kit (SDK) to turn the first observer device, which is the computing device, to perform observations of the signals from various other devices, such as IoT devices. The SDK is a set of software development tools, which may allow creation of applications (such as signal observation applications) for a software package, software framework, hardware platform, operating system, or similar platform of a computing device. The server may install and implement the SDK in computing devices to turn them into observer devices such as a first observer device, which may observe signals, and provide analytics and data about signal observation application activity back to the server.

The first observer device may observe the first set of signals at a first time point. The first time point may include a date and a time at which the first observer device observed each of the first set of signals. The first set of signals may be wireless signals. The wireless signals may include one or more broadcast mobile signals, one or more broadcast radio signals, one or more wireless local area network (LAN) signals, and the like. In a non-limiting example, the wireless signals may include signals selected from a group consisting of Wireless Fidelity (Wi-Fi), Bluetooth®, and Bluetooth Low Energy (BLE). In some embodiments, the first set of signals may be any type of signals without moving out from the scope of the disclosed embodiments.

In a next step 304, a server (for example, an analytic server) may receive a first set of signals from a first observer device. In some embodiments, the first observer device upon observing the first set of signals at the first time point, the first observer device may then determine identification information for each of the first set of signals. The identification information may include a name of a signal, a type of a signal, a name of a device from which the signal is emitted, a type of a device from which the signal is emitted, and an ID address of a device from which the signal is emitted.

The first observer device may then transmit the identification information of the first set of signals to the server over any number of internal and external data networks. The first observer device may transmit the identification information of the first set of signals to the server over any number of internal and external data networks through any suitable transmission technique. In some cases, the first observer device may be configured to periodically (e.g., daily) transmit all data records (such as the first set of signals and other data) via a data transfer protocol to the server. In some embodiments, the identification information and other data associated with the first set of signals may be fetched by the server from the first observer device based on a triggering condition (e.g., time-based periodic updates, real-time updates).

In a next step 306, a second observer device may make an observation of a second set of signals. The observation may be an event generated by the second observer device. The event may contain all signals such as the second set of signals that the second observer device scans around its zone of operation at a given time point. The event may also contain approximate or correct values of latitude and longitude coordinates of where the event occurred.

The second set of signals may be emitted by various devices such as Internet of Things (IoT) devices. The IoT may be a network of physical devices, vehicles, home appliances, and other items embedded with electronics, software, sensors, actuators, and connectivity which enables these devices to connect and exchange data over networks. The IoT devices may be remotely monitored and controlled. Non-limiting examples of the IoT device may include smart TVs, smart speakers, toys, wearables, smart appliances, smart meters, commercial security systems, smart city technologies such as those used to monitor traffic and weather conditions, smart air conditioning, smart thermostats, smart lighting, smart cars, and smart sensors.

The second observer device may be any computing and/or telecommunications device comprising a processor and capable of performing the various tasks and processes such as observing signals. Non-limiting examples of the second observer device may include a computer (e.g., desktop, laptop, server, tablet), a telephone (e.g., smartphone), a smart watch, a car, a sensor device, or any other telecommunications or computing device used to interact with various type of signals. A server may generate and execute instructions in order to turn the second observer device, which is a computing device, to perform observations of signals from various other devices, such as IoT devices. For instance, the server may provide and implement a software development kit (SDK) to turn the second observer device, which is the computing device, to perform observations of the signals from various other devices, such as IoT devices. The SDK is a set of software development tools, which may allow creation of applications (such as signal observation applications) for a software package, software framework, hardware platform, operating system, or similar platform of a computing device. The server may install and implement the SDK in computing devices to turn them into observer devices such as a second observer device, which may observe signals, and then provide analytics and data about signal observation application activity back to the server.

The second observer device may observe the second set of signals at a second time point. The second time point may include a date and a time at which the second observer device observe the second set of signals. The second set of signals may be wireless signals. The wireless signals may include one or more broadcast mobile signals, one or more broadcast radio signals, one or more wireless local area network (LAN) signals, and the like. In a non-limiting example, the wireless signals may include signals selected from a group consisting of Wireless Fidelity (Wi-Fi), Bluetooth®, and Bluetooth Low Energy (BLE). In some embodiments, the second set of signals may be any type of signals without moving out from the scope of the disclosed embodiments.

In a next step 308, a server (for example, an analytic server) may receive a second set of signals from a second observer device. In some embodiments, the second observer device upon observing the second set of signals at the second time point, the second observer device may then determine identification information for each of the second set of signals. The identification information may include a name of a signal, a type of a signal, a name of a device from which the signal is emitted, a type of a device from which the signal is emitted, and an ID address of a device from which the signal is emitted.

The second observer device may then transmit the identification information of the second set of signals to a server over any number of internal and external data networks. The second observer device may transmit the identification information of the second set of signals to the server over any number of internal and external data networks through any suitable transmission technique. For instance, in some cases, the second observer device may be configured to periodically (e.g., daily) transmit all data records (such as the second set of signals and other signals) via a data transfer protocol to the server. In some embodiments, the identification information and other data associated with the second set of signals may be fetched by the server from the second observer device based on a triggering condition (e.g., time-based periodic updates, real-time updates).

In a next step 310, a server may process and analyze a first set of signals and a second set of signals received from a first observer device and a second observer device respectively. The processing and the analyzing of the first set of signals and the second set of signals may include selection of a subset of the first and second set of wireless signals. The server may select the subset of the first and second set of wireless signals from the complete set of the first set of signals and the second set of signals based on a temporal persistence of the first and second set of wireless signals across the first and second time points. The amount of temporal persistence may be a server selectable parameter, and the server may vary the amount of temporal persistence of the first and second set of wireless signals across the first and second time points. The server upon selecting the subset of the first and second set of wireless signals based on the temporal persistence of the first and second set of wireless signals across the first and second time points may then execute algorithms such as clustering algorithms to generate a proximal grouping of the subset of the first and second set of wireless signals. The subset of the first and second set of wireless signals of the proximal grouping are the signals that may have been observed together by the first observer device and the second observer device within a number of observations of signals made by both the first observer device and the second observer device.

Any portion or subset of signals of first and second set of wireless signals may belong to more than one proximal grouping. In other words, a server computer may generate multiple proximal groupings based on observed signals where overlapping proximal grouping signals may be proximally bound to each other. For instance, when two signals that may be a subset of the first and second set of wireless signals have weights in a proximal grouping, then the two signals may appear together in a very high number of observations made by several observer devices.

In some embodiments, a proximal grouping may include a subset of first and second set of wireless signals to be in physical proximity to each other in a vector space over a period of time. In other words, the proximal groupings do not include transient signals that may be moving or simply do not appear again. Accordingly, the proximal grouping is a static relationship between the subset of the first and second set of wireless signals, as the proximity of the subset of the first and second set of wireless signals over a vector space persists across time, and observations made by the first observer device and the second observer device.

In some embodiments, a proximal grouping may also represent devices such as IoT devices that emit a subset of first and second set of wireless signals to be in physical proximity to each other over a period of time during which these devices emit the signals. In other words, the proximal grouping may not include transient signals that may be moving or simply do not appear again since such signals may be emitted by transient devices. Accordingly, the proximal grouping may be a static relationship between the subset of the first and second set of wireless signals, as the proximity of the devices emitted the subset of the first and second set of wireless signals persists across time, and observations made by the first observer device and the second observer device.

In some embodiments, a proximal grouping of a subset of first and second set of wireless signals may be a node device where the identity of the node device is fixed by a time bound and its various edges. Each edge may have a weight to denote the edge relative significance in forming a proximal grouping. For instance, the weight edges may be valuable to determine a confidence of a given signal inclusion such as inclusion of the subset of the first and second set of wireless signals in the proximal grouping. The weight edges may also be valuable to compute a likelihood that a given observation made by devices such as the first observer device and the second observer device is truthful, that is, the first observer device and the second observer device is not in a spoofed environment.

FIGS. 4-9 illustrate aspects of proximal groupings. A clustering algorithm to generate one or more proximal groupings disclosed herein is intended for IoT devices contextual authentication. For this purpose, a stable and persistent signal environment is determined, which may be observed through observer devices (such as smartphones or other type of computing devices operable as observer devices) emitting signals. To that end, several evaluations have been performed to demonstrate that the proximal groupings disclosed herein may be used as correct approximations of IoT devices for stable signal environments. Various metrics used to support these evaluations about aspects corresponding to proximal groupings may include graphs 400, 500, and 600 in FIGS. 4-6 that illustrate proximal grouping persistence over time, graphs 700, 800, and 900 in FIGS. 7-9 that illustrate correlation between persistent observations and proximal groupings, and order invariances computing that the proximal groupings may not depend on an order of observations under consideration.

During evaluations about aspects corresponding to proximal groupings, based on a random dataset sample of 273 randomly selected observer devices that reported observations over a six-month period, for each observer device under consideration, a first week of its evaluation test is taken as a baseline. If the observer device reported no observations in the first week, then the first week in which the observer device reported was set as a baseline time period. The proximal groupings computed from these observations shall henceforth be referred to as baseline proximal groupings. For the evaluation tests, weeks with fewer than 20 observations from the observer devices were excluded, and as were the observer devices that did not report any observations for at least two weeks (one baseline week and one comparison week). For the purpose of these evaluation tests, the proximal groupings from a given week w1 are built from w1s observations, and the proximal groupings from each week are built without reference to prior or future weeks. Also, a proximal grouping from a baseline week is described as persistent in week w1 if it has a cosine similarity of 0.3 or above with a proximal grouping from the week w1. A proximal grouping may also be considered persistent for a given observer device, if the proximal grouping is persistent in at least half the weeks in which the observer device reports. The size of the proximal grouping is a number of observations that were used to build it in a baseline week.

The results of the evaluations of the random dataset sample of 273 randomly selected observer devices that reported observations over a six-month period showed that, as illustrated in graph 400, out of the 273 observer devices in the sample, 223 observer devices had at least one persistent proximal grouping, while 208 observer devices had at least five persistent proximal groupings. Then out of the 50 observer devices that had no persistent proximal groupings, 18% of the 50 observer devices reported for only one week beyond a baseline time period, and as a result these observer devices had no opportunity to demonstrate persistence through at least two weeks' time period. Numerous such observer devices did report observations for several weeks, but simply did not have strong overlap with any of their baseline proximal groupings.

For these evaluations, these observer devices were taken from a MapQuest app, and as a result the observer devices may be more likely to begin reporting when the observer devices are traveling or have moved to a new place. The examination of some of the observer devices lacking persistent proximal groupings corroborated that a first week of a sample was indeed different than later observations made by the observer devices since many observer devices showed signals associated with travel, such as hotels.

As further illustrated in graph 500, while some observer devices have large numbers of persistent proximal groupings, many of such observer devices are close to each other. For instance, an observer device with a group of six neighboring proximal groupings from a baseline week gets credit for all six of those proximal groupings persisting from week to week, assuming that at least one proximal grouping from future weeks is sufficiently similar to all six proximal groupings. The observer devices with large numbers of persistent proximal groupings tend to have fewer observations in each one. While the correlation between number of persistent proximal groupings and a mean size of persistent proximal groupings is only 0.28, a relationship becomes particularly pronounced as either the number of proximal groupings or the mean size of persistent proximal groupings becomes much large than average.

The results of the evaluations further showed that transient proximal groupings were more likely to come from just one observation compared with those that came from multiple observations. The graph 600 depicts the distribution of transient proximal groupings 602 and persistent proximal groupings 604 based on the evaluation.

The evaluations were further performed to illustrate correlation between persistent observations and proximal groupings. For instance, to demonstrate that the proximal groupings may be used as correct approximations of IoT devices for stable signal environment, the observer devices should have proximal groupings that persist over time, but it may only be valuable if the persistent proximal groupings reflect a presence of similar observations from the observer devices week to week. Accordingly, a strong relationship between persistence of proximal groupings and persistence of observations is required. An evaluation was then performed to validate the relationship between the persistence of the proximal groupings and the persistence of the observations. The evaluation test included a dataset of 1492 randomly selected observer devices, and all their observations for a period of 7 months.

During the evaluations about aspects corresponding to correlation between persistent observations and proximal groupings, based on a random dataset sample of 1492 randomly selected observer devices that reported observations over a seven-month period, proximal groupings were computed independently for each week, and a first week that each observer device reported was used as a baseline period. For each week w, a number of persistent observations and a number of persistent proximal groupings were computed relative to a baseline week. The persistent observation score is simply a count of persistent observations; however, the persistent proximal groupings are weighted by a number of observations of the observer devices in each cluster.

The results of the evaluations of the random dataset sample of 1492 randomly selected observer devices that reported observations over a seven-month period showed that, as illustrated in a graph 700, a correlation between a persistent observation count and a weighted proximal grouping count is 0.86.

Furthermore, a graph 900 depicts a linear relationship between weighted proximal groupings (represented as X coordinate) and persistent observation count (represented as Y coordinate) where a high density of observer-weeks with weighted proximal groupings is revealed at "0" but potentially large number of persistent observations count. When most or all signals in an observation by observer devices are Bluetooth or far/weak Wi-Fi, these signals may not have hyper-clusters representing them. However, if these signals persist, these signals may lead to many persistent observations. For instance, the examination demonstrates that a bulk of the observations by the observer devices in this study come from either rural areas or vehicles. The graph 900 shows that most of the persistent observations come from proximal groupings whose signals were all filtered out, as most of these observations came from weeks with no persistent proximal groupings. While some weeks without persistent proximal groupings may be a result of changes in observer device routine, many come from observer devices whose static signal environments do not have sufficient signal density to form proximal groupings. Since proximal groupings contain less random variation than observations, the proximal groupings as a consequence are more stable than the observations.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    receiving, by a computer from a first observer device, identification information of a first set of wireless signals observed by the first observer device at a first timepoint at a first location;
    receiving, by the computer from a second observer device, identification information of a second set of wireless signals observed by the second observer device at a second timepoint at a second location proximate to the first location;
    receiving, by the computer from the first observer device, identification information of a third set of wireless signals observed by the first observer device at a third timepoint at a third location proximate to the first and second locations; and
    generating, by the computer, a proximal grouping of wireless signals containing a subset of the first, second, and third set of wireless signals based on a temporal persistence of the subset of wireless signals across the first, second, and third timepoints and a spatial proximity of the subset of wireless signals as indicated by the first, second, and third locations.

2. The computer-implemented method of claim 1, wherein the step of generating the proximal grouping of wireless signals further comprises:
    selecting, by the computer, the subset of the first, second, and third set of wireless signals based upon a parameter indicating a degree of overlap of wireless signals across the observations by the first and second observer devices.

3. The computer-implemented method of claim 1, wherein the step of generating the proximal grouping of wireless signals further comprises:
assigning, by the computer, a centroid of a previously generated proximal grouping of wireless signals to the proximal grouping of wireless signals.

4. The computer-implemented method of claim 3, further comprising:
in response to the computer determining that the centroid of the previously generated proximal grouping of wireless signals is incorrect for the proximal grouping of wireless signals:
calculating, by the computer, a new centroid for the proximal grouping of wireless signal.

5. The computer-implemented method of claim 1, further comprising:
associating, by the computer, the proximal grouping of wireless signal with at least one of the first location, the second location, the third location, or a fourth location proximate to the first, second, and third locations.

6. The computer-implemented method of claim 1, wherein the proximal grouping of wireless signals includes weighted associations between each pair of wireless signals in the subset of wireless signals.

7. The computer-implemented method of claim 1, wherein at least two of first, second, and third locations coincide with each other.

8. The computer-implemented method of claim 1, wherein the first, second, and third sets of wireless signals are selected from at least one of Wi-Fi, Bluetooth, and Bluetooth Low Energy (BLE).

9. The computer-implemented method of claim 1, wherein the first and second observer devices are selected from at least one of a smartphone, a smartwatch, a tablet computer, and a laptop computer.

10. A system comprising:
a non-transitory storage medium storing a plurality of computer program instructions; and
a processor electrically coupled to the non-transitory storage medium and configured to execute the plurality of computer program instructions to:
receive from a first observer device, identification information of a first set of wireless signals observed by the first observer device at a first timepoint at a first location;
receive from a second observer device, identification information of a second set of wireless signals observed by the second observer device at a second timepoint at a second location proximate to the first location;
receive from the first observer device, identification information of a third set of wireless signals observed by the first observer device at a third timepoint at a third location proximate to the first and second locations; and
generate a proximal grouping of wireless signals containing a subset of the first, second, and third set of wireless signals based on a temporal persistence of the subset of wireless signals across the first, second, and third timepoints and a spatial proximity of the subset of wireless signals as indicated by the first, second, and third locations.

11. The system of claim 10, wherein the processor is configured to further execute the computer program instructions to:
select the subset of the first, second, and third set of wireless signals based upon a parameter indicating a degree of overlap of wireless signals across the observations by the first and second observer devices.

12. The system of claim 10, wherein the processor is configured to further execute the computer program instructions to:
assign a centroid of a previously generated proximal grouping of wireless signals to the proximal grouping of wireless signals.

13. The system of claim 12, wherein the processor is configured to further execute the computer program instructions to:
in response to the processor determining that the centroid of the previously generated proximal grouping of wireless signals is incorrect for the proximal grouping of wireless signals:
calculate a new centroid for the proximal grouping of wireless signal.

14. The system of claim 10, wherein the processor is configured to further execute the computer program instructions to:
associate the proximal grouping of wireless signal with at least one of the first location, the second location, the third location, or a fourth location proximate to the first, second, and third locations.

15. The system of claim 10, wherein the proximal grouping of wireless signals includes weighted associations between each pair of wireless signals in the subset of wireless signals.

16. The system of claim 10, wherein at least two of first, second, and third locations coincide with each other.

17. The system of claim 10, wherein the first, second, and third sets of wireless signals are selected from at least one of Wi-Fi, Bluetooth, and Bluetooth Low Energy (BLE).

18. The system of claim 10, wherein the first and second observer devices are selected from at least one of a smartphone, a smartwatch, a tablet computer, and a laptop computer.

19. A non-transitory computer-readable storage medium storing instructions that, when executed by a processor of a system, cause the system to:
receive from a first observer device, identification information of a first set of wireless signals observed by the first observer device at a first timepoint at a first location;
receive from a second observer device, identification information of a second set of wireless signals observed by the second observer device at a second timepoint at a second location proximate to the first location;
receive from the first observer device, identification information of a third set of wireless signals observed by the first observer device at a third timepoint at a third location proximate to the first and second locations; and
generate a proximal grouping of wireless signals containing a subset of the first, second, and third set of wireless signals based on a temporal persistence of the subset of wireless signals across the first, second, and third timepoints and a spatial proximity of the subset of wireless signals as indicated by the first, second, and third locations.

20. The non-transitory computer-readable storage medium of claim 19, wherein the instructions cause the system to:
    select the subset of the first, second, and third set of wireless signals based upon a parameter indicating a degree of overlap of wireless signals across the observations by the first and second observer devices.

\* \* \* \* \*